INVENTOR.
CHARLES B. HOOD, JR.
WILLIAM W. VOGELHUBER
BY Schmieding and Fultz
ATTORNEYS April 11, 1967  C. B. HOOD, JR., ET AL  3,313,117
DENSE GAS HELIUM REFRIGERATOR
Filed Dec. 18, 1964  10 Sheets-Sheet 8

INVENTOR.
CHARLES B. HOOD JR
WILLIAM W. VOGELHUBER
BY Schmieding and Fultz

ATTORNEYS

United States Patent Office 3,313,117
Patented Apr. 11, 1967

3,313,117
DENSE GAS HELIUM REFRIGERATOR
Charles B. Hood, Jr., and William W. Vogelhuber, Columbus, Ohio, assignors to Cryo-Vac, Inc., Columbus, Ohio, a corporation of Ohio
Filed Dec. 18, 1964, Ser. No. 419,472
3 Claims. (Cl. 62—125)

This invention relates to dense gas helium refrigerators.

In general, the helium refrigerator of the present invention is uniquely compact for its output due to a novel arrangement of warm and cold heat exchangers and associated components all of which are mounted in a common horizontally disposed evacuated container means of extremely compact configuration. The container means as well as the helium gas supply and the other components of the refrigerator, are mounted on a common base of a refrigerator frame which is skid mounted so as to be moveable to various locations for refrigerating different thermal shrouds or other apparatus to be cooled.

The refrigerator of the present invention achieves compactness by this unique use of two relatively short horizontally disposed heat exchangers in a common evacuated container means. This is in effect cutting in half one long container means and one long heat exchager whereby the overall size of the refrigerator is subsequetly cut in half.

The refrigerator is further unique in that both the warmer and colder heat exchangers are each suspended from the Dewar walls so as to be accessible through sealed Dewar end covers. This arrangement permits thermal isolation of the warmer and colder heat exchangers from each other and from associated components of the refrigerators in a compact and economical manner while at the same time the heat exchanger and associated components are removeably accessible for servicing.

As another aspect of the present invention, the abovementioned container means and heat exchanger arrangement permits the maintenance of a bath of liquid nitrogen within the common container means and in direct heat exchange relationship with the flow of gaseous refrigerant between the warmer and colder heat exchangers. This arrangement provides a uniquely highly efficient temperature differential in the order of approximately 2 degrees Kelvin at the warm end of the low temperature heat exchanger which is a relatively small temperature differential as compared to a difference of approximately 10 degrees Kelvin between the paths at the low temperature end of the warm heat exchanger.

The difference between the 10 degree temperature difference at the cold ends of the paths of the warm heat exchanger and the 2 degree temperature difference at the warm end of the paths of the cold heat exchanger is absorbed by the previously mentioned liquid nitrogen bath surrounding the gas purifier through which is passed the flow between the two exchangers. This further contributes to the compactness of the refrigerator as it results in a relatively small temperature differential for any given physical dimensions of the two heat exchangers.

As another advantage of the present invention, even more compactness of size is achieved by feeding the warm end of the warm heat exchanger with a helium supply from a compressor provided with a suction pressure regulating apparatus which further eliminates the need for large supply gas holders.

As another advantage of the present invention the refrigerator is provided with a rapid cool-down apparatus which greatly reduces the time required to cool down the refrigerator itself and the load. This is accomplished in two hours as compared with many hours or days, the latter being the required time without the rapid cool-down feature.

As another advantage the refrigerator of the present invention includes an automatic temperature controller which operates at cryogenic temperatures and which accurately regulates the temperature of the refrigerant leaving the load and entering the cold heat exchanger.

As still another advantage of the present invention the refrigerator includes an absorption type gas purifier located in the flow between the warm and cold heat exchangers which serves to remove gaseous impurities such as oxygen, nitrogen, and carbon dioxide which would otherwise freeze-out in colder portions of the refrigeration cycle.

It is, therefore, an object of the present invention to provide a dense gas helium refrigerator that is highly efficient yet extremely compact for its capacity.

It is another object of the present invention to provide a refrigerator of the type described that provides a uniquely highly efficient low temperature differential between series connected warmer and colder heat exchangers.

It is another object of the present invention to provide a refrigerator of the type described that utilizes a novel suction pressure regulator apparatus at the intake side of the compressor whereby large gas holders are eliminated.

It is another object of the present invention to provide a refrigerator of the type described that includes a rapid cool-down apparatus whereby the load in the refrigerator itself can be brought down to operating temperatures in a minimum of time.

It is another object of the present invention to provide a refrigerator of the type described that includes an automatic temperature controller that permits the setting of various desired temperatures for the return flow of refrigerant whereby the small critical temperature difference at the cold ends of the paths of the low temperature heat exchanger can be precisely maintained at various desired temperature values.

Further objects and advantages of the present invention will be apparent from the following description, reference being had to the accompanying drawings wherein a preferred form of embodiment of the invention is clearly shown.

Figure 1:
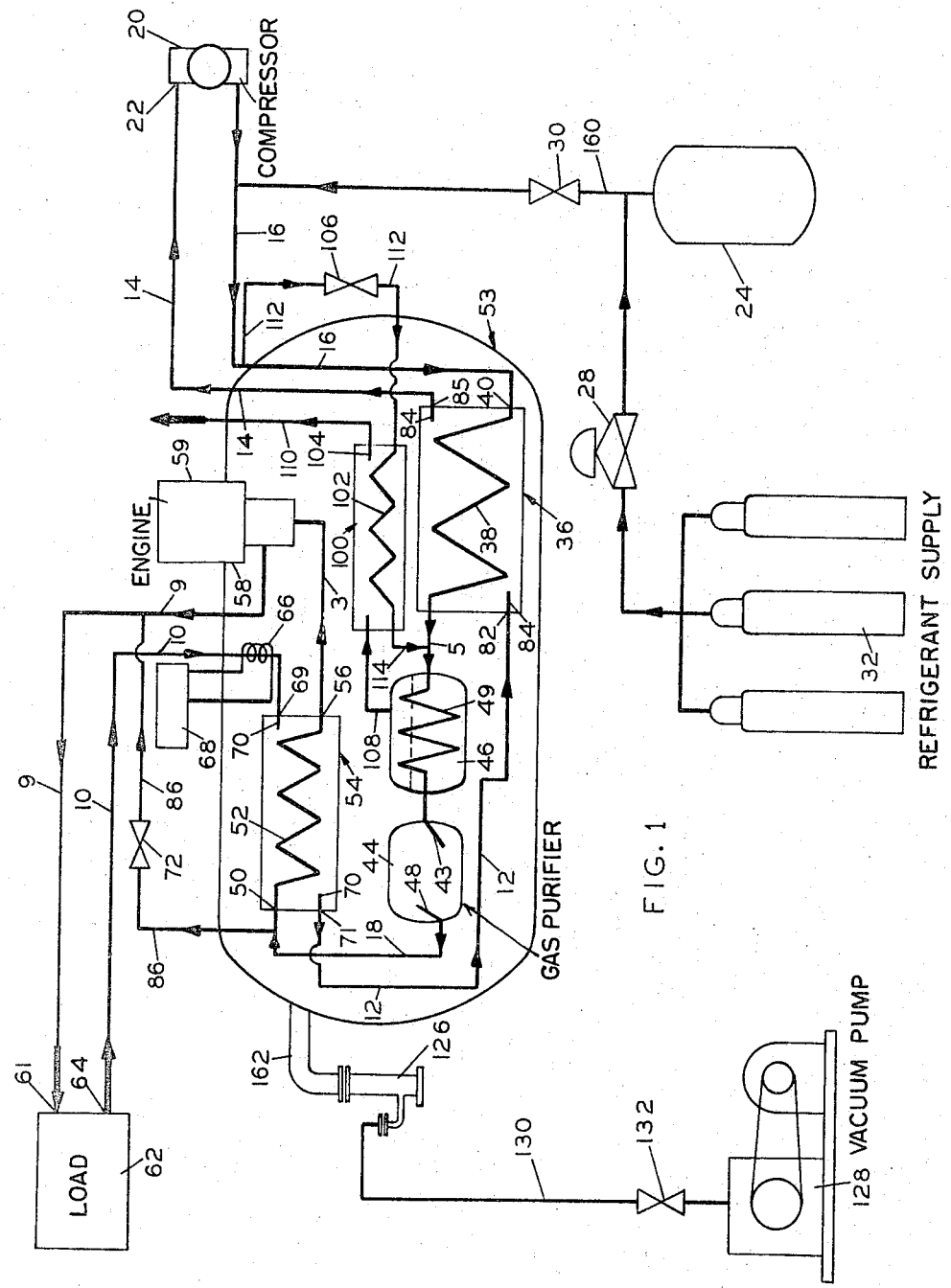
FIG. 1 is a diagrammatic view of a dense gas helium refrigerator constructed in accordance with the present invention.

Referring in detail to the drawings, FIG. 1 is a diagrammatic view of the refrigeration cycle of a helium refrigerator constructed in accordance with the present invention.

The system includes a compressor 20 that delivers refrigerant via a line 16 through the inlet 40 of a warmer high pressure pass of a warmer heat exchanger indicated generally at 36.

Refrigerant is delivered to line 16 from a gaseous helium supply 32, pressure regulator valve 28, receiver tank 24, and pressure regulator valve 30.

Valve 28 serves to maintain a constant pressure, for example 50 p.s.i. in tank 24 whereas valve 30 serves to maintain a constant pressure for example 30 p.s.i. at the outlet of the valve leading to the previously mentioned line 16.

With continued reference to FIG. 1, when the gas leaves an outlet 5 of warmer path 38 of the warmer heat exchanger 36 it is delivered to a liquid nitrogen heat exchanger in the form of a coil 49 that is immersed in a bath of evaporating liquid nitrogen 46.

It should also be pointed out that coil 49 in liquid nitrogen bath 46 serves to reduce the temperature of the refrigerant before it is delivered to the colder heat exchanger 54 and the bath 46 of liquid nitrogen is continuously evaporating to the environment via line 108 and a colder low pressure path 104 of an auxiliary heat exchanger 100 wherein the sensible heat of the vaporized cryogen is utilized to augment the cooling effect of the warmer heat exchanger 36. After leaving exchanger 100 the boiled off nitrogen is released to the environment via line 110. The boiling point temperature of liquid nitrogen bath 46 is 77 degrees Kelvin.

After the refrigerant leaves coil 49 it is delivered to the inlet 43 of an abrosption type gas purifier 44 that contains an adsorptive substance such as silica gel, charcoal, or the like.

The purpose of purifier 44 is to freeze out gaseous impurities such as oxygen, nitrogen, and carbon dioxide which would otherwise freeze out in colder portions of the cycle.

With continued reference to FIG. 1, the outlet 48 of purifier 44 is connected by a conduit 18 to an inlet 50 of a warmer path 52 of a cold heat exchanger indicated generally at 54 and outlet 56 of this heat exchanger delivers the refrigerant to the inlet of an engine 58.

It should be pointed out that the warmer heat exchanger 36 and colder heat exchanger 54 are disposed in a common evacuated container means 53.

The expansion engine works against an external load applied by a synchronous motor, or other suitable means, located outside the container means.

The outlet of the engine is in turn connected by a line 9 to the inlet 61 of the load 62 to be refrigerated.

After the gaseous refrigerant passes through the load it leaves the outlet 64 via a conduit 10 and thence passes through a heating element 66 of a flow temperature controller 68. Controllers of this type include a sensing means that automatically varies a variable voltage transformer to increase or decrease the heating effect applied to the gaseous flow via heating element 66 as may be required to maintain a constant temperature, for example 20 degrees Kelvin, at an inlet 69 of a colder low pressure path 70 through cold heat exchanger 54.

After the flow leaves outlet 71 of colder path 70 of cold exchanger 54 via conduit 12 it enters an inlet 82 of a colder low pressure path 84 of warmer heat exchanger 36 and upon leaving outlet 85 of warmer heat exchanger 36 it is returned via a conduit 14 to the inlet 22 of compressor 20.

For purposes of rapid cool-down a bypass conduit 86 is connected between conduit 18 and conduit 9. A shutoff valve 72 is provided for controlling the cool-down operation.

In operation of the cycle of FIG. 1, gaseous helium from a pressurized supply 32 passes through the previously described valve means wherein pressure regulating valve 28 maintains tank 24 at 50 p.s.i. and pressure control valve 30 maintains a line pressure of 30 p.s.i. at the inlet 22 of compressor 20.

The refrigerant leaves the compressor at 300 p.s.i. and 300 degrees Kelvin and is cooled down to 90 degrees Kelvin in warmer paths 38 of warm heat exchanger 36.

The gas leaves the evaporating bath 46 of liquid nitrogen at approximately 82 degrees Kelvin and in passing through purifier 44 the previously mentioned impurities are frozen-out.

In flowing through the warmer path of the low temperature heat exchanger the temperature drops to 22 degrees Kelvin and then to 15 degrees Kelvin in passing through expansion engine 58.

In passing through the load 62 the refrigerant absorbs 5 degrees and is raised to 20 degrees Kelvin or to other temperature values slightly above or below 20 degrees Kelvin. Before the flow is returned to the cooler path 70 of the cold heat exchanger it is precisely controlled by temperature controller 68 so that it enters the cooler path at 20 degrees Kelvin to provide an exact temperature difference at the cold end of the low temperature exchanger.

It should be pointed out that the temperature difference at the cold end of the low temperature heat exchanger is critical since in taking heat out of the load 62 temperature difference is relatively small; i.e., 5 degrees Kelvin. It should, therefore, be understood that if even one degree it lost in the temperature difference at the cold end of the low temperature heat exchanger; say, a temperature rise from two degrees to 3 degrees Kelvin, then there is a resulting loss of 20 degrees in the total output efficiency of the refrigerator.

The gas from the cold end of the low temperature heat exchanger is warmed in the return flow through the warm heat exchanger and thence delivered back to the suction side of the compressor to complete the cycle.

For purposes of rapid cool down, at the outset of operation, valve 72 is opened whereby cold helium gas from the outlet of purifier 44 is released directly into load 62 via line 86. When the load cools the cold gas goes back to the low temperature heat exchanger thereby cooling low temperature heat exchanger 54 and also expansion engine 58, said expansion engine being in heat exchange relationship with the low temperature heat exchanger.

Referring again to FIG. 1 a by-pass valve 106 is opened to divert some of the helium refrigerant through the previously mentioned auxiliary heat exchanger 100 in heat exchange relationship with gaseous nitrogen being released from bath 46 through the auxiliary heat exchanger via a colder low pressure path 104 and thence to the environment via vent line 110. The helium refrigerant flow through a warmer high pressure path 102 in auxiliary heat exchanger 100 and thence is delivered to coil 49 in the liquid nitrogen heat exchanger via lines 114 and 5.

It should be mentioned that container means 53, FIG. 1, is evacuated through penetration 162, diffusion pump 126, valve 132 and vacuum pump 128.

Reference is next made to FIGS. 2–7 which illustrate the actual refrigerator mechanism which includes a frame indicated generally at 21. The frame comprises vertical frame members 23, horizontal frame members 25, and skids 27, the latter serving to facilitate moving the refrigerator to various loads to be refrigerated.

Figure 2:
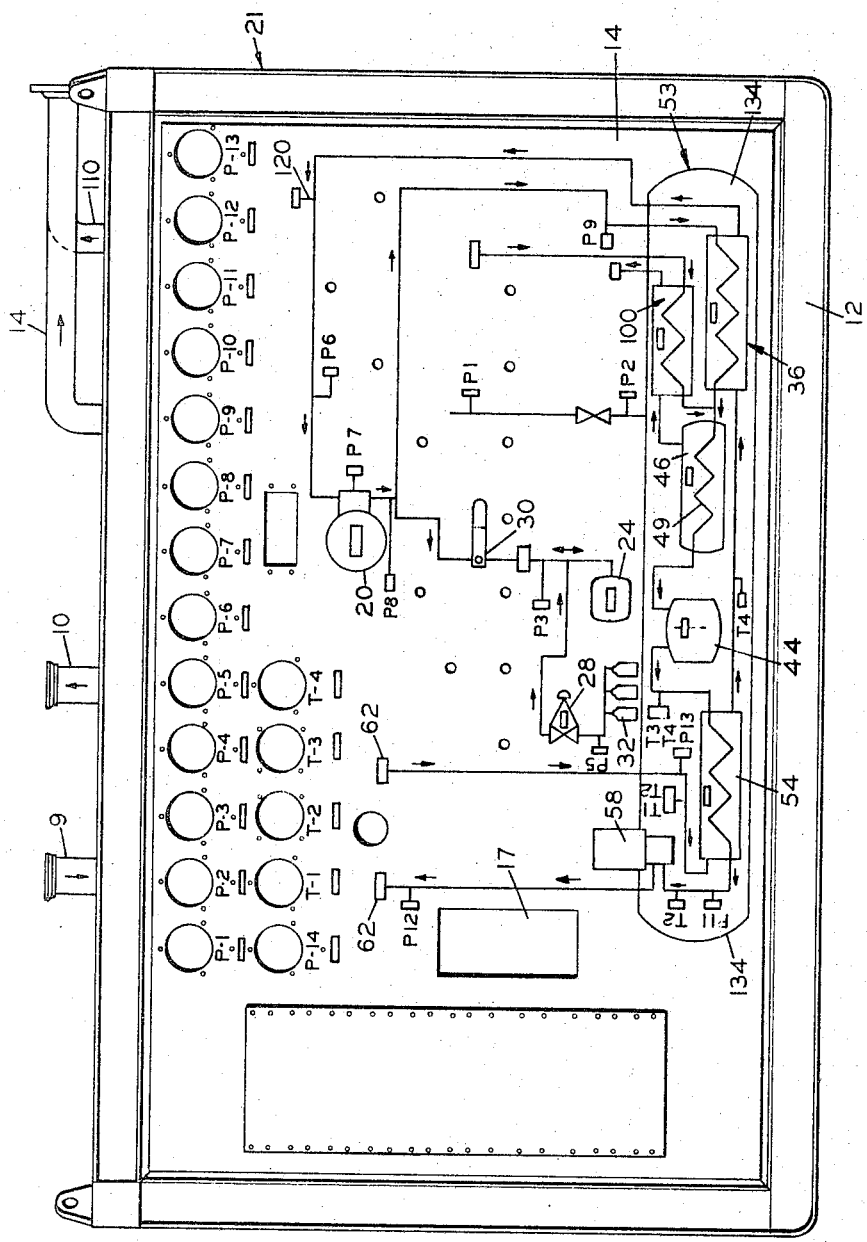
FIG. 2 is a front elevational view of the helium refrigerator of the present invention.

As seen in FIG. 2, the front of the refrigerator comprises a large size graphic control panel indicated generally at 29 which diagrammatically illustrates the refrigeration cycle in essentially the same detail as the previously described diagrammatic view of FIG. 1. In addition, a plurality of pressure gauges P–1 through P–14 and a plurality of temperature gauges T–1 through T–4 are mounted on the upper portion of graphic control panel 29 and serve to show pressures at the various points that are correspondingly designated in the flow system of the refrigeration cycle.

It will also be seen that the front panel of the refrigerator, FIG. 2, includes a control station indicated generally at 17.

With continued reference to FIGS. 2 through 7, frame means 21 supports the previously mentioned horizontal container means 53 by means of a plurality of upright supports 31.

Figure 3:
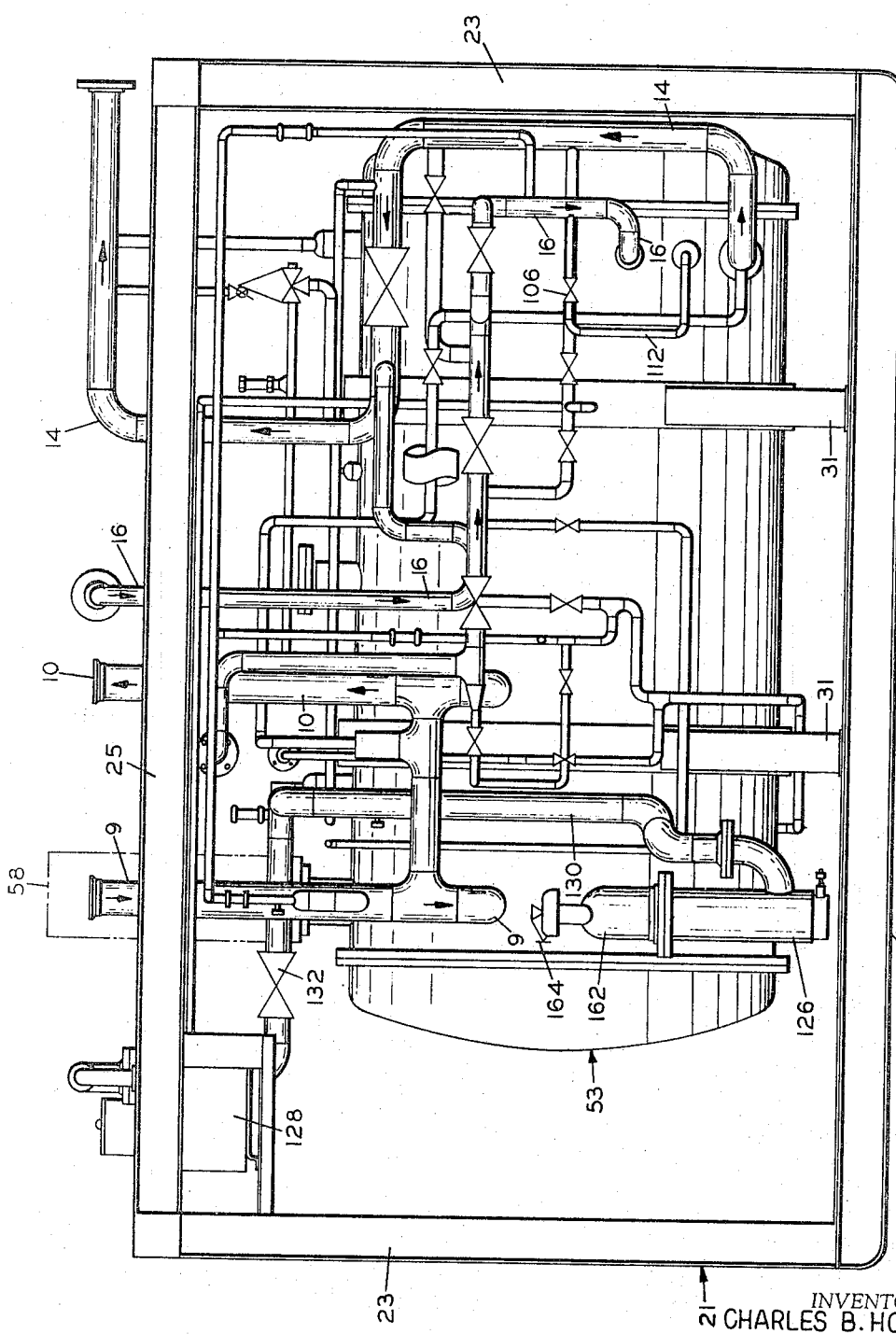
FIG. 3 is a front sectional view of the helium refrigerator of FIG. 2, the section being taken along the line 3—3 of FIG. 4.
Figure 4:
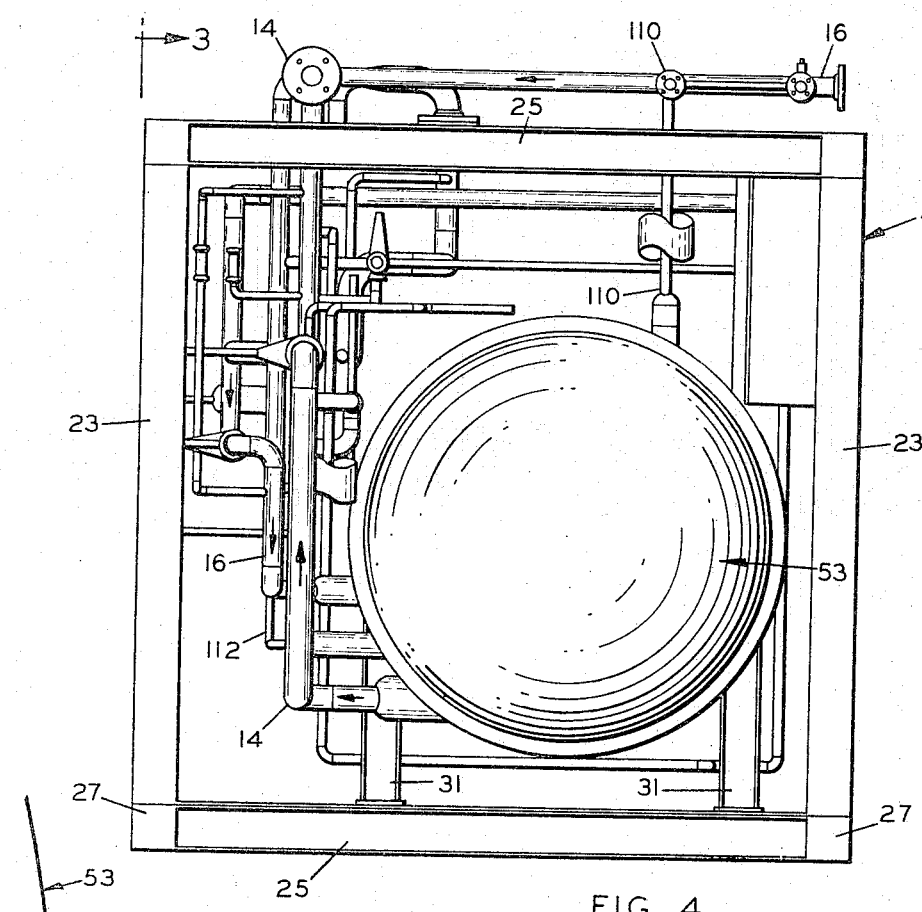
FIG. 4 is a right-side elevational view of the helium refrigerator of the preceding figures.
Figure 5:
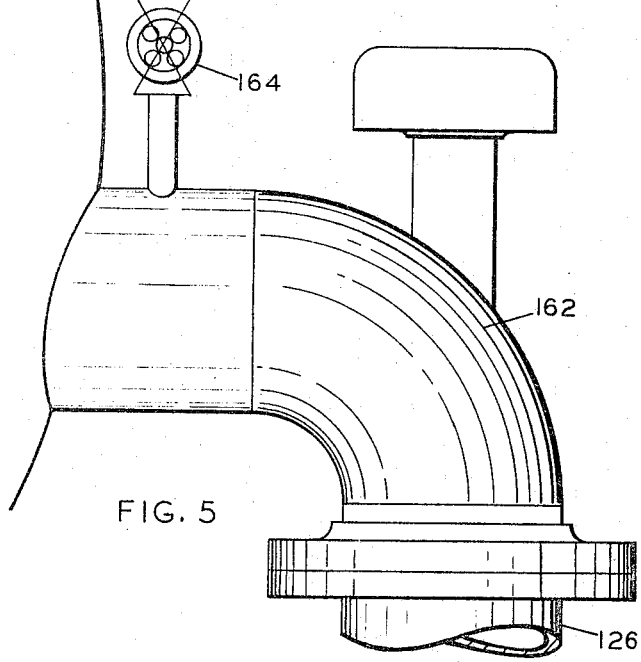
FIG. 5 is a partial view showing a vacuum pump and line for exhausting the container means comprising a portion of the apparatus of the present invention.
Figure 6:
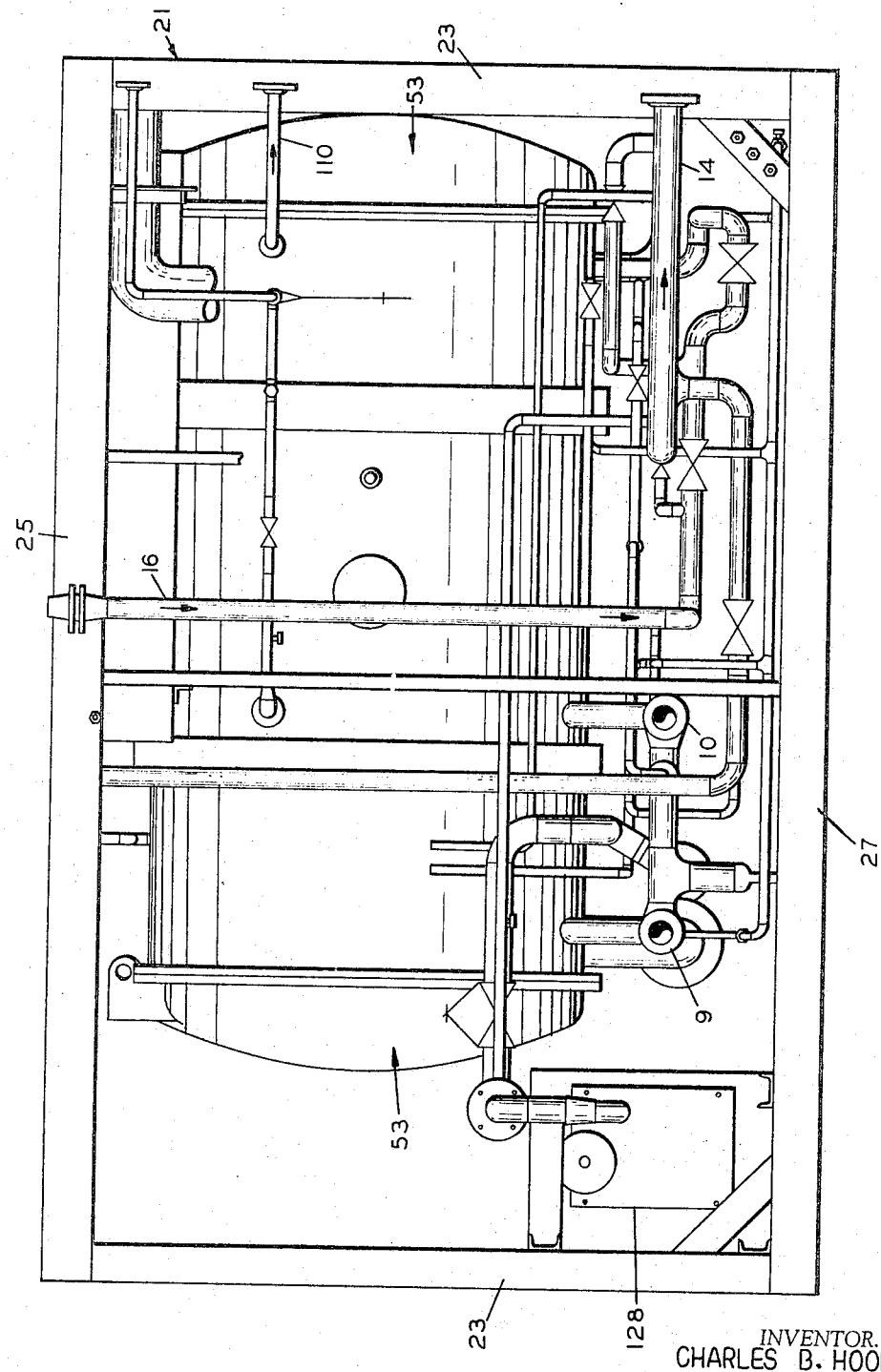
FIG. 6 is a top elevational view of the helium refrigerator of the preceding figures.
Figure 7:
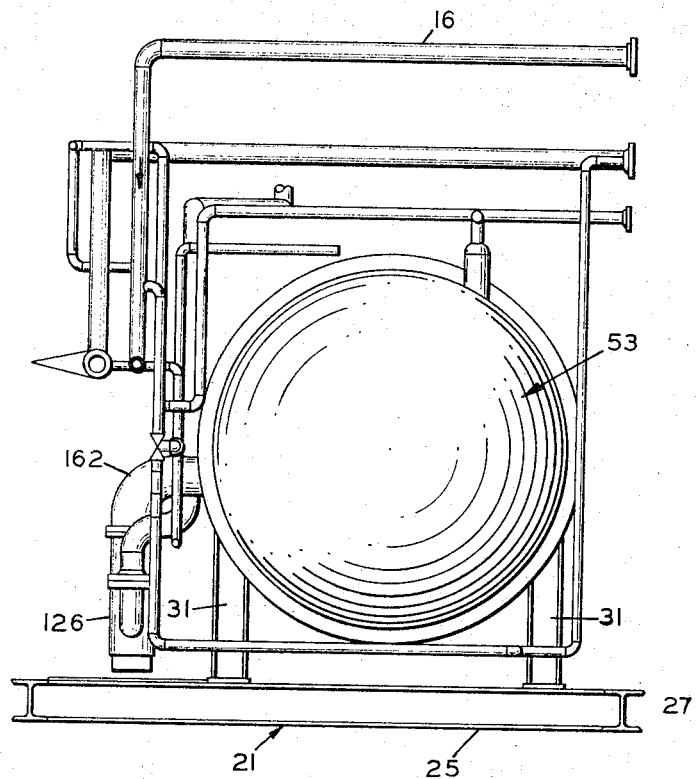
FIG. 7 is a right sectional view of the refrigerator of the preceding figures, the section being taken along the line 7—7 of FIG. 3.

With particular reference to FIGS. 3 and 4, the previously mentioned refrigerant delivery line 16 and refrigerant return line 14 are shown entering the refrigerator and container means 53 at the top of the figures.

The vacuum pump 128 and control valve 132 are shown mounted to the upper left portion of the frame means 21 in FIG. 3. This figure along with FIG. 4 also illustrates the location of the exhaust line penetration 162 that leads to the previously mentioned diffusion pump 126. This construction along with a repressurization valve 164 are shown in enlarged detail in FIG. 5.

With continued reference to FIG. 3, the previously mentioned expansion engine is shown supported on top of the container means 53 at the numeral 58.

At this point, it should be pointed out that the piping system illustrated in FIGS. 2 through 7 is merely representative of a piping system exterior of evacuated container means 53 which is supported by the frame means. Because of illustration difficulties it is not necessarily complete in detail since the actual piping flow system is illustrated in accurate detail in the diagrammatic view of FIG. 1.

Reference is next made to FIGS. 8 through 12 which illustrate the arrangement of the various refrigeration components within horizontal evacuated Dewar 53. Here it will be seen that colder heat exchanger 54 is mounted above warmer heat exchanger 36 and the liquid nitrogen exchanger that includes refrigerant coil 49 disposed in the previously mentioned bath 46 is mounted forwardly of the colder heat exchanger.

Figure 12:
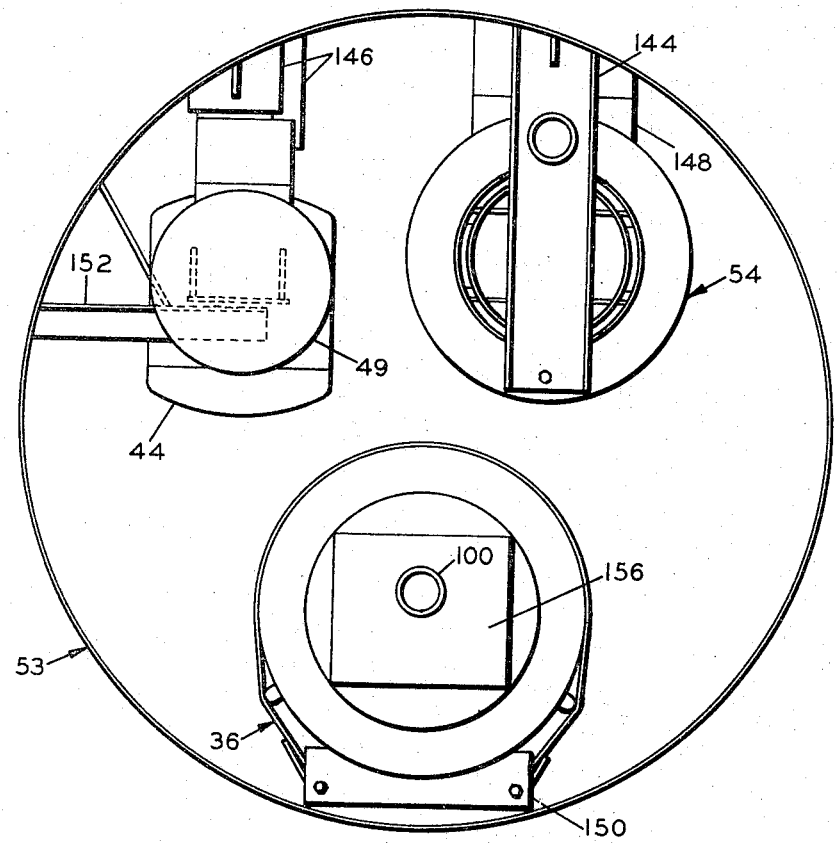
FIG. 12 is a left side sectioinal view of the container means of the preceding figures, the section being taken along the line 12—12 of FIG. 8.

As seen in FIG. 12, purifier 44 is also suspended from the container means forwardly of colder heat exchanger 54.

Figure 11:
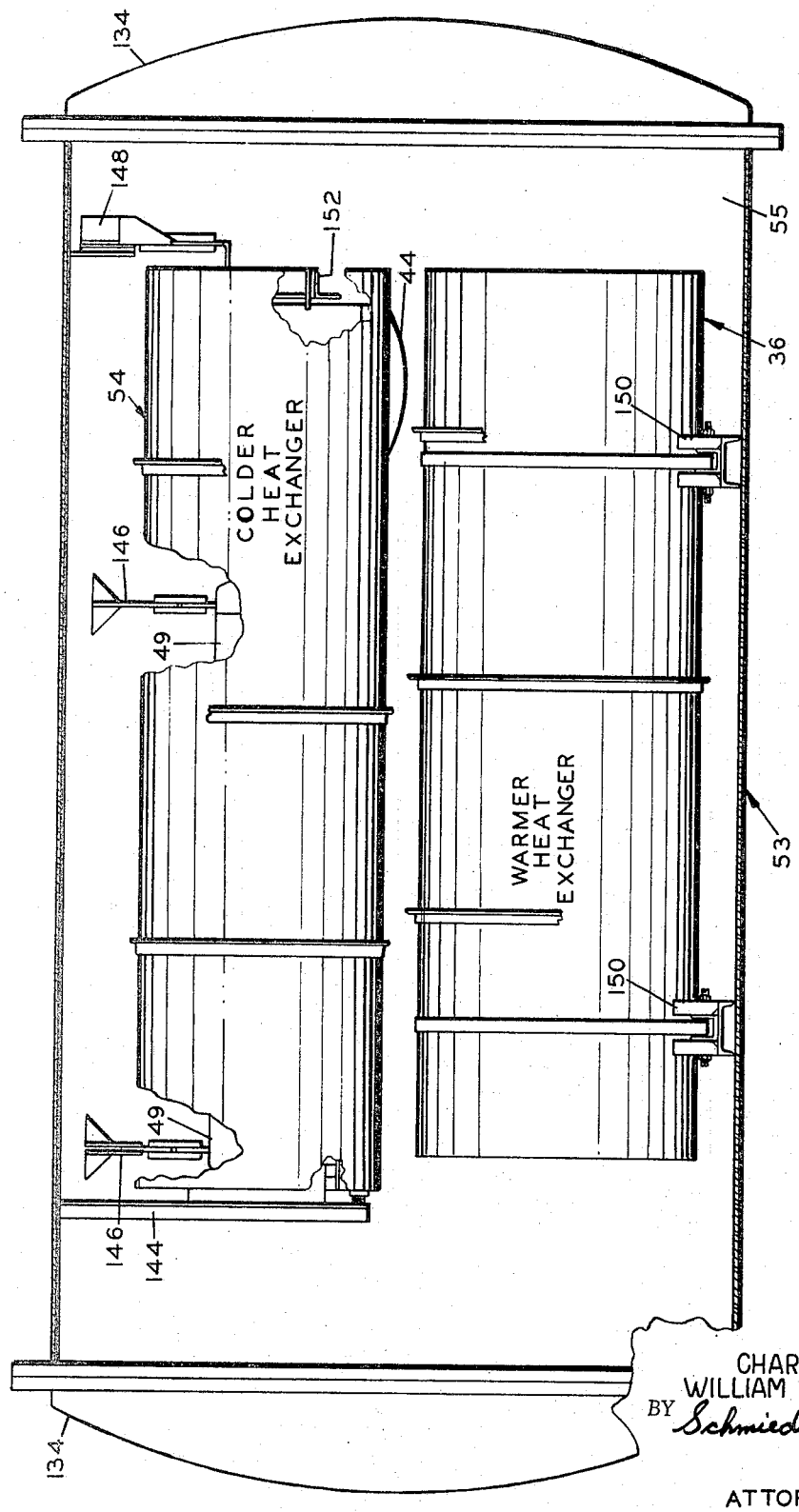
FIG. 11 is a broken side view of the container means of the preceding figures and showing the components mounted in the interior thereof.

Details of the supports for the heat exchangers are best seen in FIG. 11. It will be noted that colder heat exchanger 54 is suspended from the top wall of the container means by a plurality of low conduction colder exchanger supports 148.

The warmer heat exchanger is supported on the bottom wall of the container means by a plurality of low conduction warmer exchanger supports 150.

As seen in FIG. 12, the liquid nitrogen exchanger 49 is, like the colder heat exchanger, suspended from the top wall of the container means by a plurality of supports 146.

It will now be understood that the various heat exchangers are thermally isolated one from the other by low thermal conductive supports and further are surrounded by evacuated insulating space within the sealed container means 53.

Figure 8:
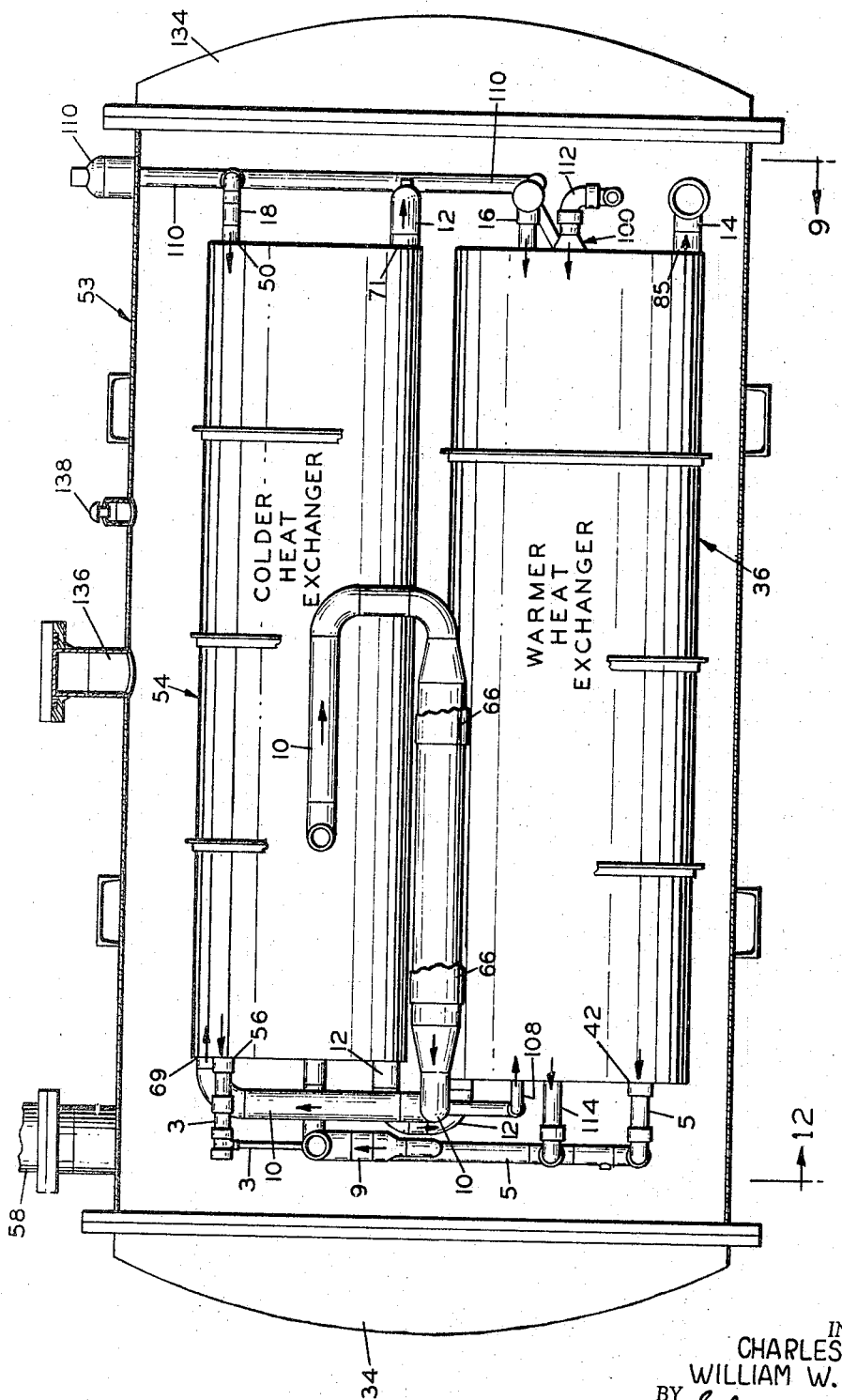
FIG. 8 is a front elevational view of a container means comprising a portion of the refrigerator apparatus of the preceding figures.

As seen in FIGS. 8 and 11, access to the interior of container means 53 is provided for by right and left removable end caps 134.

Referring again to FIG. 12, the previously described auxiliary heat exchanger 100, FIG. 1, is mounted centrally of warmer heat exchanger 26 by extending the auxiliary heat exchanger through holes in a plurality of micarta supports 156.

Figure 9:
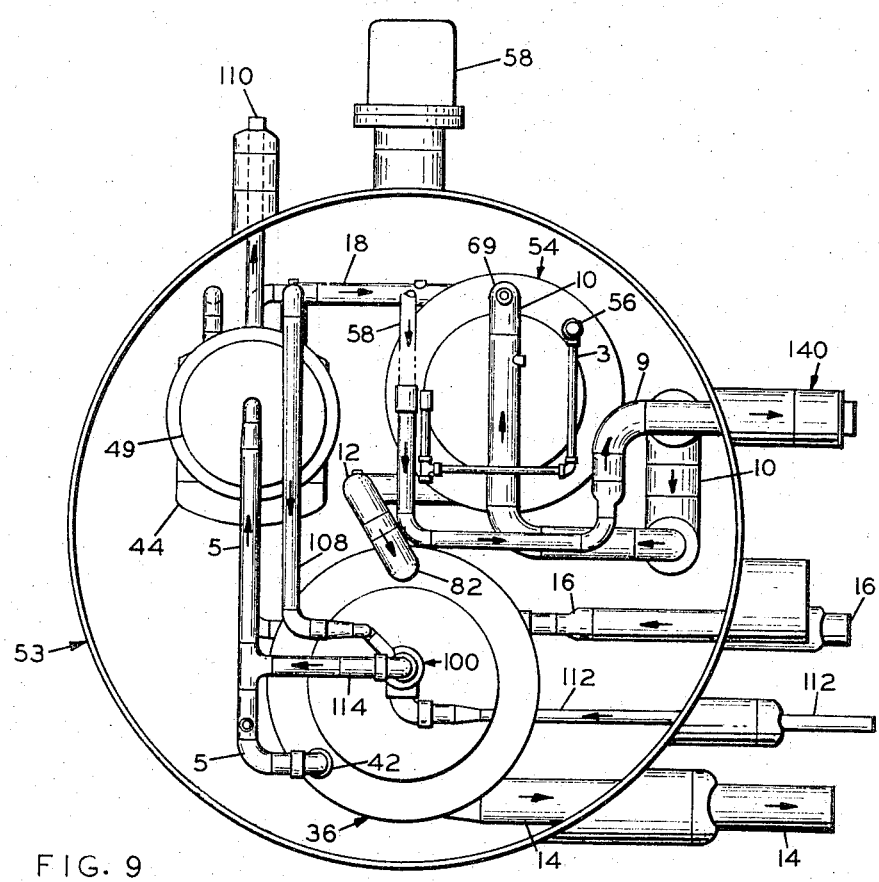
FIG. 9 is a right sectional view of the container means of FIG. 8 and showing the components mounted therein, the section being taken along the line 9—9 of FIG. 8.

With particular reference to FIGS. 8 and 9, the expansion engine 58 of FIG. 1 is shown mounted on the top wall of container means 53.

Figure 10:
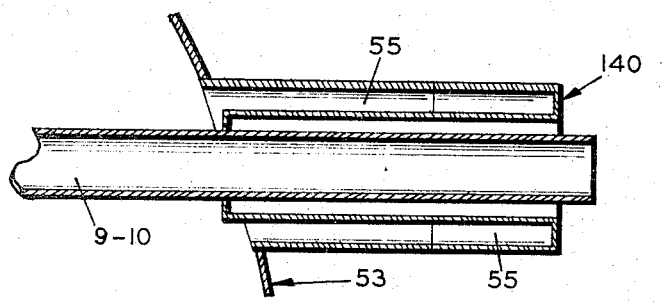
FIG. 10 is a side sectional view of a line penetration for the container means of the preceding figures, the section being taken along a vertical plane through the centerline of the device.

The penetration construction for the cold lines that pass through the wall of the container means, such as lines 9 and 10, illustrated in enlarged section in FIG. 10.

The various lines that connect the components within evacuated container means 53 are designated by the same numerals used to designate the lines connecting the corresponding diagrammatic symbols in FIG. 1. The various line connections within the container means will therefore not be repeated here.

While the form of embodiment of the present invention as herein disclosed constitutes a preferred form, it is to be understood that other forms might be adopted, all coming within the scope of the claims which follow.

We claim:

1. A helium refrigerator comprising, in combination, a load to be refrigerated; a compressor; an evacuated sealed container means; a warmer heat exchanger mounted in said container means; a cooler heat exchanger mounted in said container means; an expansion engine at least partially mounted within said container means; a refrigerant delivery conduit means leading from an outlet of said compressor through said warmer and colder heat exchangers and said expansion engine to said load to be refrigerated; a refrigerant return conduit means leading from said load through said colder and warmer heat exchangers to the inlet of said compressor; a graphic control panel including a flow diagram of said refrigeration cycle including component symbols, the flow path therethrough, and marked diagram stations along said flow path; a plurality of sensing means located along the flow through the above mentioned components at apparatus stations corresponding to said diagram stations; a plurality of gauges respectively connected to said sensing means; and indicia on said panel relating said diagram stations to gauges for corresponding apparatus stations.

2. A helium refrigerator comprising, in combination, a load to be refrigerated; an evacuated container means; a horizontally disposed warmer heat exchanger in said container means and supported in insulated relationship with the walls thereof; a horizontally disposed colder heat exchanger in said container means and supported in insulated relationship with the walls thereof, said warmer heat exchanger being series connected with said colder heat exchanger; an expansion engine at least partially disposed in said container means; compressor delivery and return conduits connected to said warmer heat exchanger and extended through a wall of said container means; a load delivery conduit connected between said load and said expansion engine and extended through a wall of said container means; a load return conduit connected between said load and said colder heat exchanger and extended through a wall of said container means; a graphic control panel including a flow diagram of said refrigeration cycle including component symbols, the flow path therethrough, and marked diagram stations along said flow path; a plurality of sensing means located along the flow through the above mentioned components at apparatus stations corresponding to said diagram stations; a plurality of gauges respectively connected to said sensing means; and indicia on said panel relating said diagram stations to gauges for corresponding apparatus stations.

3. A helium refrigerator comprising, in combination, a load to be refrigerated; frame means; an evacuated container means mounted on said frame means; a horizontally disposed warmer heat exchanger in said container means and supported in insulated relationship with the walls thereof; a horizontally disposed colder heat exchanger in said container means and supported in insulated relationship with the walls thereof, said colder heat exchanger being series connected with said warmer heat exchanger; an auxiliary heat exchanger mounted in said container means; a vessel containing a liquefied cryogenic gas mounted in said container means and supported in insulated relationship with the walls thereof; a line connecting said warmer and colder heat exchangers and extended in heat exchange relationship with said liquefield cryogenic gas; a second line connected to said vessel and extended through said auxiliary heat exchanger to the environment; an expansion engine at least partially disposed in said container means; a load delivery conduit connected between said load and said expansion engine and extended through a wall of said container means; and a load return conduit connected between said load and said colder heat exchanger and extended through a wall of said container means.

References Cited by the Examiner

UNITED STATES PATENTS

| | | | |
|---|---|---|---|
| 2,737,032 | 3/1956 | Latham | 62—513 X |
| 2,927,437 | 3/1960 | Rae | 62—53 |
| 2,967,961 | 1/1961 | Heil | 62—514 X |
| 3,118,751 | 1/1964 | Seidel | 62—88 X |
| 3,125,863 | 3/1964 | Hood | 62—77 X |
| 3,195,322 | 7/1965 | London | 62—467 |
| 3,195,620 | 7/1965 | Steinhardt | 165—2 |

ROBERT A. O'LEARY, *Primary Examiner.*

MEYER PERLIN, *Examiner.*

W. E. WAYNER, *Assistant Examiner.*